US005784420A

United States Patent [19]

Rohr

[11] Patent Number: 5,784,420

[45] Date of Patent: Jul. 21, 1998

[54] METHOD FOR RESYNCHRONIZATION OF A DATA RECEPTION DEVICE

[75] Inventor: Wilkin Rohr, Leipzig, Germany

[73] Assignee: Siemens Aktiengesellschaft, Munich, Germany

[21] Appl. No.: 520,414

[22] Filed: Aug. 29, 1995

[30] Foreign Application Priority Data

Aug. 31, 1994 [DE] Germany .......................... 44 31 023.4

[51] Int. Cl.$^6$ .......................... H04L 7/00

[52] U.S. Cl. .......................... 375/354; 375/366; 370/503

[58] Field of Search .......................... 375/354, 357, 375/366; 370/503, 509, 510, 511, 520

[56] References Cited

U.S. PATENT DOCUMENTS

| | | | |
|---|---|---|---|
| 4,500,992 | 2/1985 | Fladerer . | |
| 4,763,324 | 8/1988 | Schwierz | 370/510 |
| 4,766,602 | 8/1988 | Wilkinson et al. | 375/366 |
| 4,833,674 | 5/1989 | Takai et al. | 370/510 |
| 4,890,304 | 12/1989 | Annamalai | 375/366 |
| 5,010,559 | 4/1991 | O'Connor et al. | 370/510 |

FOREIGN PATENT DOCUMENTS

| | | |
|---|---|---|
| 0343083 A1 | 11/1989 | European Pat. Off. . |
| 32 12 450 | 10/1983 | Germany . |
| 37 22 567 | 1/1989 | Germany . |
| 40 27 262 | 3/1992 | Germany . |
| 41 23 137 | 1/1993 | Germany . |
| 36 16 556 | 4/1993 | Germany . |
| 60-085640 | 5/1985 | Japan . |
| 61-180967 | 8/1986 | Japan . |
| 2000342 | 1/1979 | United Kingdom . |
| 2213028 | 8/1989 | United Kingdom . |

OTHER PUBLICATIONS

"ARQ 1000 Duplex", Siemens AG, Ref. No. F255/122.08.101 PA3771, pp. 1–6, (no date).

*Primary Examiner*—Don N. Vo
*Attorney, Agent, or Firm*—Hill & Simpson

[57] ABSTRACT

The method is for resynchronizing a Data Reception Device. An error in synchronization occurs in multiplex equipment due to simulated frame alignment words. This situation is identified by a monitor that outputs an asynchronous desynchronization command (AB). The command is intermediately stored and is only evaluated with a window pulse (RI). As a result thereof, an error in synchronization, after whose appearance a resynchronization ensues, is avoided.

5 Claims, 1 Drawing Sheet

METHOD FOR RESYNCHRONIZATION OF A DATA RECEPTION DEVICE

BACKGROUND OF THE INVENTION

In synchronous data transmission, the clock frame of the reception device must coincide with the word boundaries and, given multiplex equipment, must additionally coincide with the pulse frame of the received digital signal. The synchronization, for example, can ensue on the basis of specific code rules that are contained in the transmitted data words. Likewise, bit combinations can be used that do not occur or only rarely occur in the transmitted data words. For example, they can be inserted at the beginning of a pulse frame as frame alignment word.

However, the frame alignment word (or other synchronization criteria) can be simulated by successive data words with slight probability. In order to avoid an error in synchronization, a check is carried out to determine whether the frame alignment word periodically occurs again. The analogous case applies given data words that have specific code rules or combinations.

A check for synchronism also ensues during the data transmission. When the synchronization criteria is not recognized over a long time span, then resynchronization usually ensues.

An error in synchronization can also occur in consultation systems such as the electronic multiplex system ELMUX or ARQ (Siemens AG, Ref.No. F255/122.08.101 PA3771). As a result the same data is constantly repeated, and transmission is prevented. Since a specific data word appears and since there is no violation of a code rule, the error in synchronization cannot be recognized. However, a resynchronization can be initiated, for example, on the basis of missing data output. The manual resynchronization signal is intermediately stored and converted into a synchronous pulse that shifts the timing pattern of the receiver by one bit. The check of the received digital signal thus begins shifted by one bit immediately after the simulated synchronization criterion. It is thereby assured that all possible phase positions can be successively checked bit-by-bit and it is guaranteed that all phase positions, including the correct one, are reached in any case.

Malsynchronizations that cannot be recognized on the basis of a check of a frame alignment word also occur in new multiplex systems.

German Published Application P 32 12 405 discloses a synchronization means for multiplex systems. As a special characteristic, this system has a second frame counter that also allows other frame alignment words to be reacted to during the 'synchronized' condition and thereby shortens the resynchronization time. The resynchronization begins after the appearance of the window pulse (frame pulse), just as in all other synchronizations.

When constantly changing data, for example text, are transmitted, then a frame alignment word is not simulated over a long period of time. When, by contrast, unmodified auxiliary information or unchanging measured data is transmitted, then a simulated frame alignment word that simulates the correct synchronization can be continuously received. In some instances, there is an additional monitoring of the transmitted data for plausibility, for example with a digital computer system. Independent of the frame position, the monitoring means now outputs a desynchronization command that triggers a resynchronization. When the simulated frame alignment word is located shortly before the correct frame alignment word, then there is a high probability that the asynchronous desynchronization command is given in the time span between the correct frame alignment word and the simulated frame alignment word. The simulated frame alignment word is then recognized next, and a correct resynchronization is thereby prevented.

SUMMARY OF THE INVENTION

It is an object of the present invention to provide a method for correct resynchronization.

In general terms the present invention is a method for the resynchronization of a data reception means, whose frame counter periodically outputs a window pulse at the beginning of a pulse frame, on the basis of an asynchronous desynchronization command. The desynchronization command is intermediately stored until the appearance of the window pulse and initiates a resynchronization only after the appearance thereof.

In an advantageous development of the present invention only the change from passive to active of the desynchronization command initiates a resynchronization and the duration of the activation of this command exerts no influence on the synchronization behavior.

The particular advantage of the inventive method lies in its simplicity. When the synchronization is enabled at the proper moment, then it also operates correctly.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
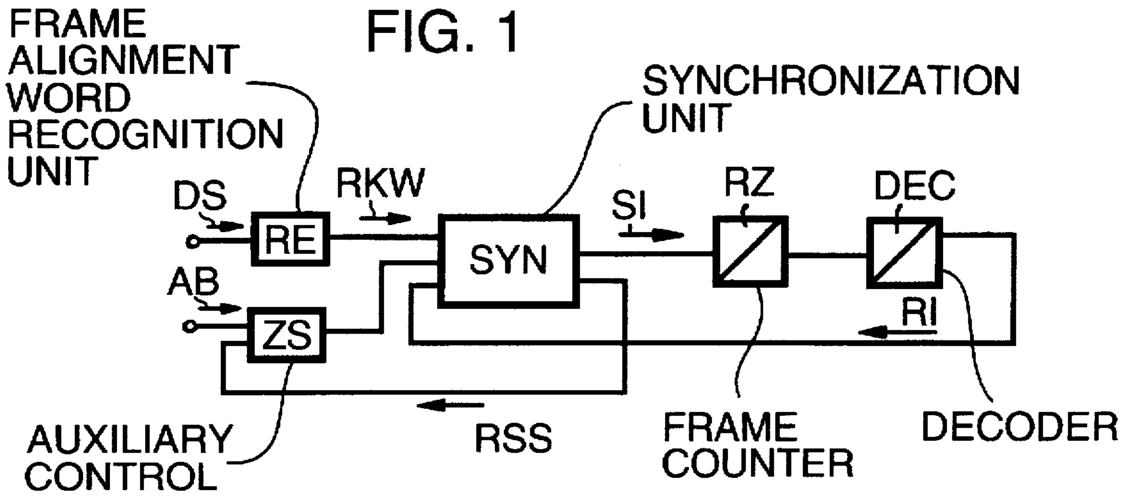
FIG. 1 is a block circuit diagram depicting the present invention.

The block circuit diagram shown in FIG. 1 shows functions blocks for the synchronization of a data receiver. A received data signal DS is supplied to a frame alignment word recognition unit RE that outputs a one-bit long pulse at its output when it has recognized a frame alignment signal RKW (or has calculated a corresponding signal from the received data). This pulse is supplied to a synchronization unit SYN that can output a synchronization pulse SI at this point in time for the synchronization of a frame counter RZ. Subsequently, via a decoder DEC connected to the frame counter RZ, a window pulse RI that is supplied to the synchronization unit SYN is periodically output at this point in time at which the frame alignment word is expected.

An auxiliary control ZS is also provided via which an external desynchronization command AB is supplied to the synchronization unit SYN.

The fundamental functioning of the synchronization is known. In the synchronization phase, the frame counter RZ that controls all functions of the receiver means is set given the appearance of a frame alignment word.

In the synchronized condition, the synchronization unit SYN checks whether the frame alignment word appears at the expected points in time. When this is not the case over a long time span, a resynchronization, that is, another check of the received digital signal and a resetting of the frame counter, is initiated.

Numerous versions of synchronization units are known that attempt to avoid synchronization errors and unnecessary resynchronizations.

As initially set forth, a periodic reception of the frame alignment word can occur given the transmission of unchanging data. The synchronization unit SYN is then no longer in the position of recognizing this faulty condition and initiating a resynchronization. However, on the basis of the data output by the reception means a monitoring means that checks the further received data for plausibility can recognize this condition and end it with a desynchronization command AB. This asynchronous signal is supplied to an auxiliary control ZS and is stored thereat in order to initiate a resynchronization at the point in time of the window pulse.

Figure 2:
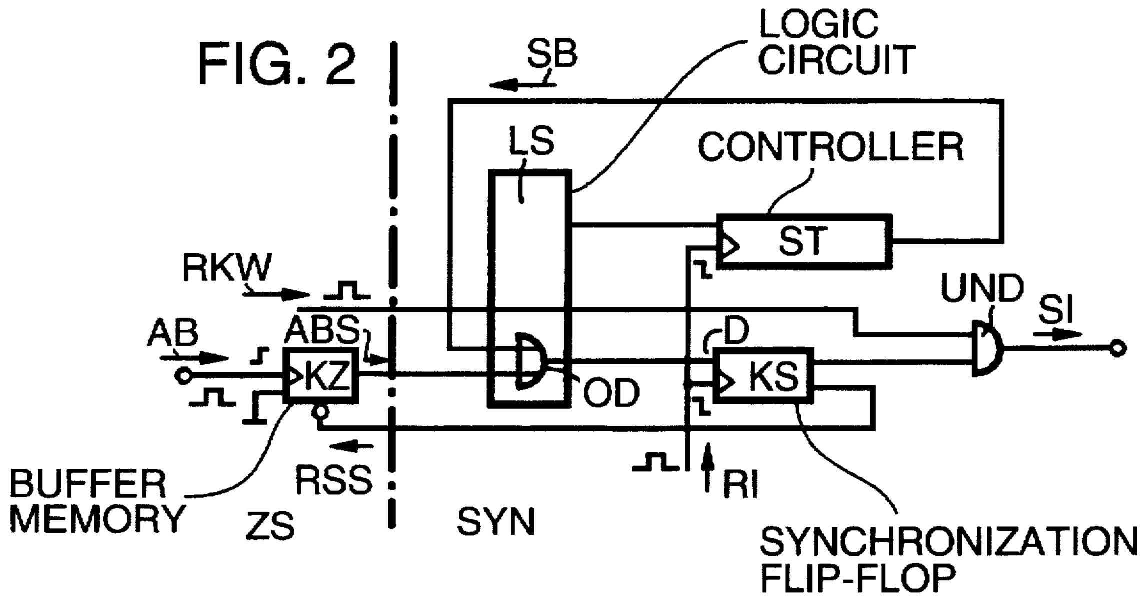
FIG. 2 depicts circuit details of the present invention.

The most important circuit details of the synchronization unit SYN and of the auxiliary control ZS are depicted in FIG. 2. The synchronization unit SYN contains a logic circuit LS, a controller ST and a synchronization flipflop KS that can also be considered to belong to the controller ST. The logic circuit LS is supplied with the frame alignment word RKW, a command for resynchronization SB output by the controller ST and the intermediately stored desynchronization command ABS. The auxiliary control ZS contains a buffer memory KZ for the acceptance of the asynchronous desynchronization command AB.

The resynchronize command SB and the intermediately stored desynchronization command ABS, via an OR-gate OD in the logic circuit LS, are supplied to the D-input of the synchronization flipflop KS. The two commands effect the setting of the synchronization flipflop KS with the trailing edge of the window pulse RI. The synchronization readiness is thereby produced after the potentially existing one-bit long pulse RKW that signals a simulated frame alignment word (RV, FIG. 3) is no longer effective. Of course, the "synchronization" of the desynchronization command AB can already ensue in the auxiliary control ZS with the window pulse RI or a pulse allocated thereto.

After the point in time of the appearance of the simulated frame alignment word and the readiness for resynchronization that has then been produced, a received frame alignment word RKW is supplied to an AND-gate UND that is connected to the output of the synchronization flipflop. The AND gate UND outputs a synchronization pulse SI that sets the frame counter and thereby effects a resynchronization. As a result of the setting of the synchronization flipflop KS, this resets the flipflop, that serves as buffer memory KZ, with a reset signal RSS via its reset input and thus erases the intermediately stored desynchronization command. Only another desynchronization command can set this again after the end of a synchronization. The controller ST is also informed about the resynchronization and begins checking to determine whether the frame alignment word periodically appears.

The present invention can be utilized with numerous circuit modifications. The synchronization and auxiliary control can also be realized in terms of software. Peculiarities of the desynchronization command can also be taken into consideration, for example, a resynchronization is only initiated when a desynchronization command is still present.

Figure 3:
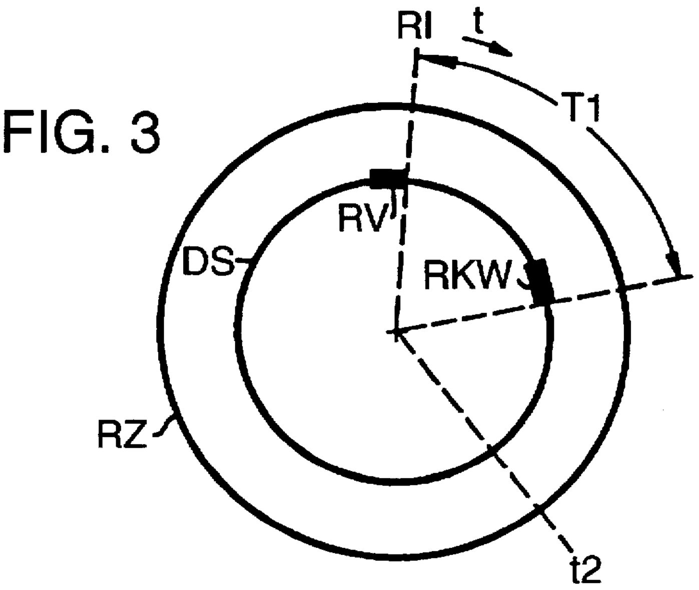
FIG. 3 is a diagram for explaining the functioning of the present invention.

The diagram of FIG. 3 shows the time relationships as a transformation between the frame counter of the reception means and the received signal. The window pulse RI repeats periodically. The frame alignment word RKW and a simulated frame alignment word VR also periodically appear in the digital signal DS.

The known function of a synchronization unit is to bring the window pulse into coincidence with the end of the frame alignment word RKW by controlling the frame counter. The time interval between window pulse and frame alignment word is $T_1$. When a resynchronization begins outside this time interval $T_1$, for example when the desynchronization command AB is given at a time $t_2$ that immediately leads to the beginning of the resynchronization and, thus, to the monitoring, then the simulated frame alignment word VR will be recognized again as the next frame alignment word and the error in synchronization will remain. When, by contrast (as in the case of a resynchronization initiated by the synchronization unit itself), the resynchronization is begun immediately after the window pulse, and a correct synchronization is achieved.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for resynchronizing a data reception device in response to an asynchronous desynchronization command, the data reception device having a frame counter that periodically outputs a window pulse at a beginning of a pulse frame, comprising the steps of:

intermediately storing the desynchronization command until appearance of the window pulse; and initiating resynchronization of the data reception device only after the appearance of the window pulse.

2. The method according to claim 1, wherein the desynchronization command has an active state and a passive state, wherein only a change from the passive state to the active state initiates the resynchronization, and wherein a duration of the active state exerts no influence on synchronization behavior of the data reception device.

3. A method for resynchronizing a data reception device in response to an asynchronous desynchronization command, the data reception device having a frame counter that periodically outputs a window pulse at the beginning of a pulse frame, comprising the steps of:

providing a desynchronization command;

intermediately storing the desynchronization command in a buffer memory;

receiving a window pulse; and initiating resynchronization of the reception device and erasing said stored desynchronization command from said buffer memory.

4. The method according to claim 3, wherein the desynchronization command has an active state and a passive state, and wherein only a change from the passive state to the active state allows initiation of a resynchronization of the data reception device.

5. A method for resynchronizing a data reception device in response to an asynchronous desynchronization command, the data reception device having a frame counter that periodically outputs a window pulse at the beginning of a pulse frame, comprising the steps of:

providing a desynchronization command having an active state and a passive state;

intermediately storing the desynchronization command in a buffer memory;

receiving a window pulse;

initiating resynchronization of the reception device only after the desynchronization command changes from the passive state to the active state; and erasing said stored desynchronization command from said buffer memory.

* * * * *